(12) United States Patent
Choi et al.

(10) Patent No.: US 8,144,604 B2
(45) Date of Patent: Mar. 27, 2012

(54) METHOD AND SYSTEM FOR ALLOCATING MULTIPLE CHANNELS IN A MESH NETWORK

(75) Inventors: Young-Gon Choi, Suwon-si (KR); Jung-Ho Kim, Suwon-si (KR); Jae-Hoon Kim, Seoul (KR); Ji-Hoon Lee, Cheongju-si (KR); Yong-Sung Roh, Icheon-si (KR); Shubhranshu Singh, Yongin-si (KR); Chul-Hee Kang, Seoul (KR); Joo-Sang Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 913 days.

(21) Appl. No.: 11/431,880

(22) Filed: May 11, 2006

(65) Prior Publication Data

US 2006/0256737 A1    Nov. 16, 2006

Related U.S. Application Data

(60) Provisional application No. 60/679,981, filed on May 12, 2005.

(30) Foreign Application Priority Data

May 3, 2006   (KR) .................. 10-2006-0039932

(51) Int. Cl.
*H04J 1/16* (2006.01)
(52) U.S. Cl. .............. 370/248; 370/230.1; 370/254; 370/329; 370/395.32; 370/442; 455/62; 455/435.2
(58) Field of Classification Search .............. 370/229, 370/235, 254, 329, 395.32, 397, 442, 458, 370/503; 709/241
See application file for complete search history.

(56) References Cited

U.S. PATENT DOCUMENTS

| | | | |
|---|---|---|---|
| 6,185,210 B1 * | 2/2001 | Troxel | 370/395.32 |
| 6,741,572 B1 * | 5/2004 | Graves et al. | 370/254 |
| 2002/0062388 A1 * | 5/2002 | Ogier et al. | 709/238 |
| 2002/0080768 A1 * | 6/2002 | Garcia-Luna-Aceves et al. | 370/349 |
| 2002/0176440 A1 * | 11/2002 | Hammel et al. | 370/458 |
| 2004/0193729 A1 * | 9/2004 | Saraph | 709/241 |
| 2005/0097196 A1 * | 5/2005 | Wronski et al. | 709/223 |
| 2005/0180356 A1 * | 8/2005 | Gillies et al. | 370/329 |
| 2005/0213583 A1 * | 9/2005 | Lee et al. | 370/395.5 |
| 2006/0109815 A1 * | 5/2006 | Ozer et al. | 370/329 |

* cited by examiner

*Primary Examiner* — Dwayne Bost
*Assistant Examiner* — Inder Mehra
(74) *Attorney, Agent, or Firm* — NSIP Law

(57) ABSTRACT

A method and system for establishing multiple channels between nodes each having a single radio interface in a mesh network supporting multiple channels are provided. Each node in the mesh network initially generates a neighbor node table, taking into account at least one traffic channel temporarily established for data transmission to a neighbor node. The neighbor node table is updated when a traffic channel is established for data transmission to the neighbor node, and the neighbor node table is updated according to channel use information of the neighbor node received from the neighbor node or channel use information of a node two hops away.

18 Claims, 8 Drawing Sheets

METHOD AND SYSTEM FOR ALLOCATING MULTIPLE CHANNELS IN A MESH NETWORK

PRIORITY

This application claims the benefit under 35 U.S.C. §119 (e) of an application filed in the U.S. Patent and Trademark Office on May 12, 2005 and assigned Ser. No. 60/679,981, and claims priority under 35 U.S.C. §119(a) to an application filed in the Korean Intellectual Property Office on May 3, 2006 Ser. No. 2006-39932, the entire disclosures of both of which are hereby incorporated by reference.

BACKGROUND OF THE INVENTION

1. Field of the Invention

The present invention relates generally to a method and system for allocating multiple channels in a mesh network. More particularly, the present invention relates to a method and system for allocating multiple channels between nodes which each have a single interface.

2. Description of the Related Art

Today, mobile communication technology is being developed toward maximization of transmission rate and frequency use efficiency in order to provide multimedia service. A major example is a mobile access network. The mobile access network refers to a network that provides high-speed wireless service to terminals within predetermined service coverage.

A traditional mobile access network is a set of local networks which each include Access Points (APs) and legacy Stations (STAs). A legacy STA receives an intended wireless service by association with an AP.

The mobile access network has recently evolved to a mesh network which combines a plurality of local networks. The mesh network is comprised of a plurality of nodes called Mesh Points (MPs). The MPs function as APs in local networks and directly exchange information with neighboring APs by association.

In the mesh network, communication is typically conducted between nodes via a single channel as illustrated in FIG. 1 or via multiple channels as illustrated in FIG. 2. In the former case, when a neighbor node uses a single channel, another node that the neighbor node may interfere with cannot use the channel. In the latter case, communications can be conducted between nodes simultaneously within an allowed number of channels.

FIG. 3 is a diagram illustrating a signaling procedure for data transmission between nodes which each have a single interface in a conventional mesh network supporting multiple channels. Data transmission is performed on a first channel (Channel 1) between a first node (Node #1) and a second node (Node #2) and on a second channel (Channel 2) between a third node (Node #3) and a fourth node (Node #4).

Referring to FIG. 3, channels are established during a beacon interval in the mesh network. The beacon interval is divided into an Ad-hoc Traffic Indication Message (ATIM) window and a data transmission interval. Within the ATIM window, a common channel is set up and during the data transmission interval, a selected channel is set up.

FIG. 4 is a diagram illustrating a signal flow between nodes during a data transmission interval in the conventional mesh network. Node #3 attempts to communicate with Node #2 which is communicating with Node #1. Therefore, Node #1 and Node #2 initially use the same channel and Node #3 uses a different channel.

Referring to FIG. 4, in the presence of transmission data, Node #1 broadcasts a Request to Send (RTS) message in step 410. Upon receipt of the RTS message, Node #2 broadcasts a Clear to Send (CTS) message in step 412.

Upon receipt of the CTS message, Node #1 sends data to Node #2 in step 414. Node #2 then replies to the data transmission with an acknowledgement (ACK) signal.

Meanwhile, Node #3 listens to a different channel from that of Node #1 and Node #2 has no knowledge of the situations of Node #1 and Node #2. When Node #3 needs to send data, it switches to a channel for communicating with a neighbor node and sends an RTS message in steps 416 and 418. If Node #3 switches to the channel in use for Node #1 and Node #2, a serious interference occurs. This is called a "Hidden Terminal Problem" which is encountered when multiple channels are used.

Accordingly, there is a need for an improved system and method to allocate multiple channels to solve hidden terminal problems between MPs which each have a single interface.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and system for allocating multiple channels to solve the hidden terminal problem between MPs which each have a single interface.

Exemplary embodiments of the present invention provide a method and system for allocating multiple channels, in which each node manages its neighbor node table for managing channel use state information in a mesh network.

Yet another object of exemplary embodiments of the present invention is to provide a method and system for allocating multiple channels, in which a neighbor node table is updated according to a change in channel use state in a mesh network.

Exemplary embodiments of the present invention also provide a method of monitoring the channel use state of a node which is 2 hops away from each node and updating a neighbor node table according to the monitored channel use state, and a multi-channel allocation system therefore.

Exemplary embodiments of the present invention provide a method and system for allocating multiple channels, in which a determination of whether to use a channel referring to a neighbor node table is made, upon request for a channel from a neighbor node.

According to one aspect of an exemplary embodiment of the present invention, a method of establishing multiple channels between nodes each with a single radio interface in a mesh network supporting multiple channels is provided. Each node in the mesh network initially generates a neighbor node table, taking into account at least one traffic channel temporarily established for data transmission to a neighbor node. The neighbor node table is updated when a traffic channel is established for data transmission to the neighbor node, and the neighbor node table is updated according to channel use information of the neighbor node received from the neighbor node or channel use information of a node two hops away.

According to another aspect of an exemplary embodiment of the present invention, in a system for multiple channels between nodes each with a single radio interface in a mesh network supporting multiple channels, a transmitting node updates a first neighbor node table when a traffic channel is established for data transmission and when the data transmission is completed and thus the traffic channel is released. A receiving node updates a second neighbor node table when the traffic channel is released for data reception from the transmitting node and when the data reception is completed and thus the traffic channel is released. A neighbor node updates a third neighbor node when a traffic channel is permitted by the receiving node in response to the traffic channel requested by the transmitting node and when the use of the traffic channel by the transmitting or receiving node is terminated. A two-hop node updates a fourth neighbor node table by a channel setup message received from the neighbor node in correspondence with the permitted traffic channel and by a channel release response message received from the neighbor node in correspondence with the released traffic channel. The transmitting node, the receiving node, the neighbor node, and the two-hop node each generate the neighbor node table initially according to at least one traffic channel temporarily established for data transmission.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention is intended to provide a method of establishing multiple channels between nodes which each have a single radio interface in a mesh network environment. For this purpose, radio channels available within a network are divided into control channels and traffic channels. For example, one radio channel is established as a control channel used to establish a traffic channel and the other radio channels are established as traffic channels. Therefore, each node cannot simultaneously access the control channel and a traffic channel. In other words, each node can access the control channel or the traffic channel.

For multi-channel establishment according to an exemplary embodiment of the present invention, each node may have a neighbor node table in the mesh network environment. The node manages information relating to traffic channels in use for neighbor nodes using the neighbor node table. The range of neighbor nodes whose traffic channel information to be managed is adaptively determined. Preferably, neighbor nodes within a mutual interference range are selected. In an exemplary embodiment of the present invention, the neighbor node range is set to two hops.

An exemplary embodiment of the present invention also provides a method of sharing the traffic channel information of neighbor nodes in each node. A channel setup message Relay_ch_info, a channel release message Ch_rel, and a channel response message Ch_resp are newly defined to provide a method of sharing the traffic channel information of neighboring nodes in each node. By these messages, a node shares the channel setup information, channel release information, and channel state information of a neighbor node.

Figure 1:
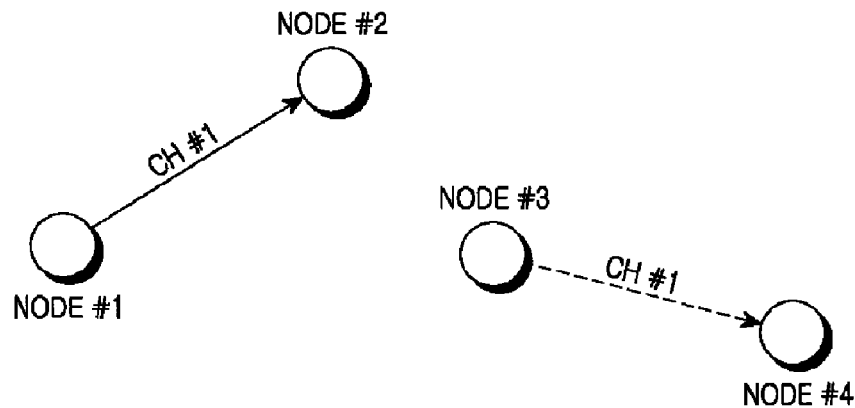
FIG. 1 illustrates communications on a single channel between nodes in a typical mesh network.
Figure 2:
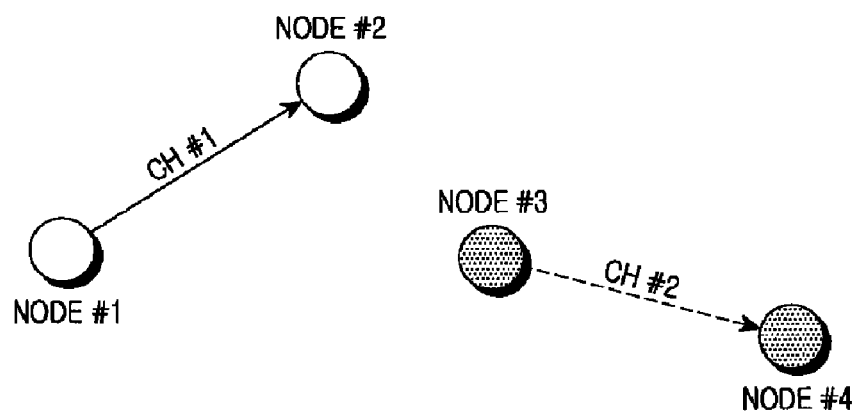
FIG. 2 illustrates communications on multiple channels between nodes in the typical mesh network.
Figure 3:
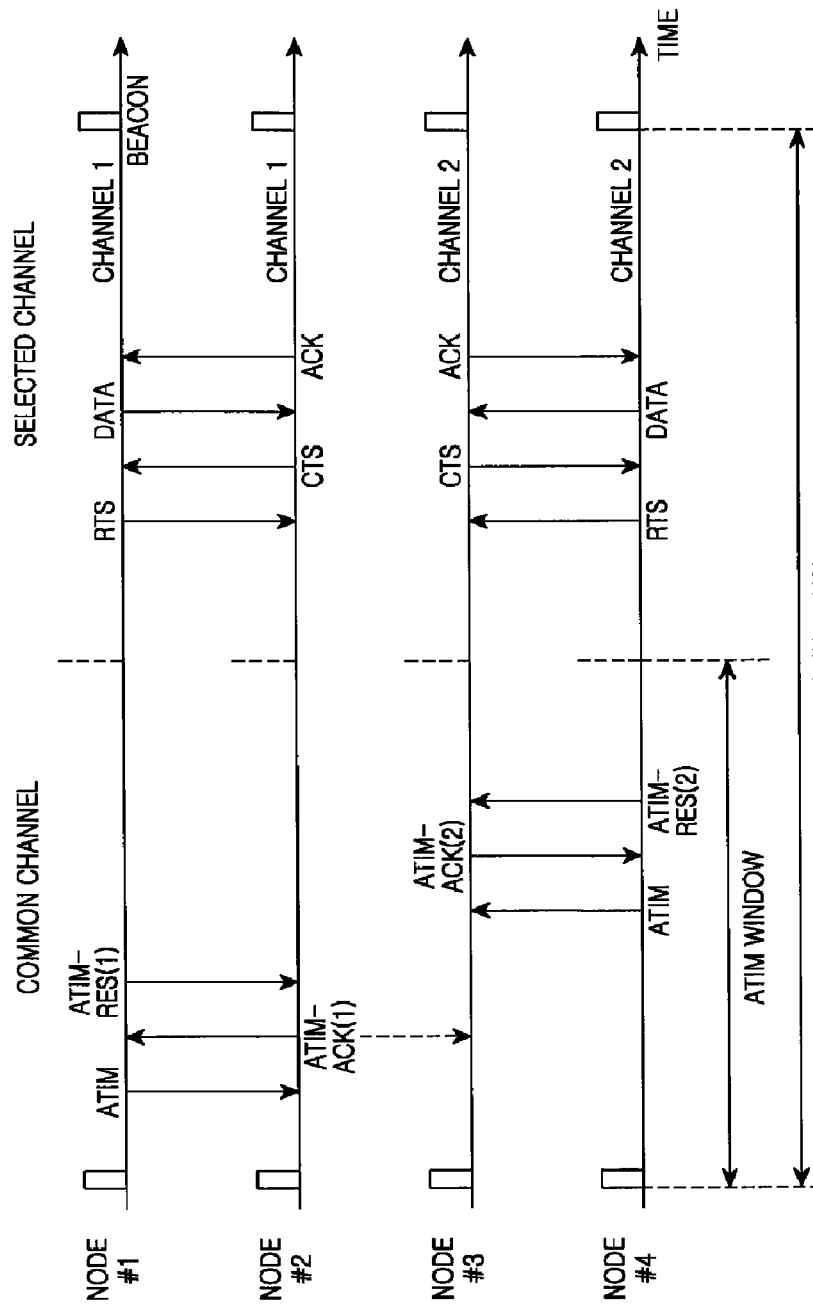
FIG. 3 is a diagram illustrating a signaling procedure for data transmission between nodes which each have a single interface in a conventional mesh network supporting multiple channels.
Figure 4:
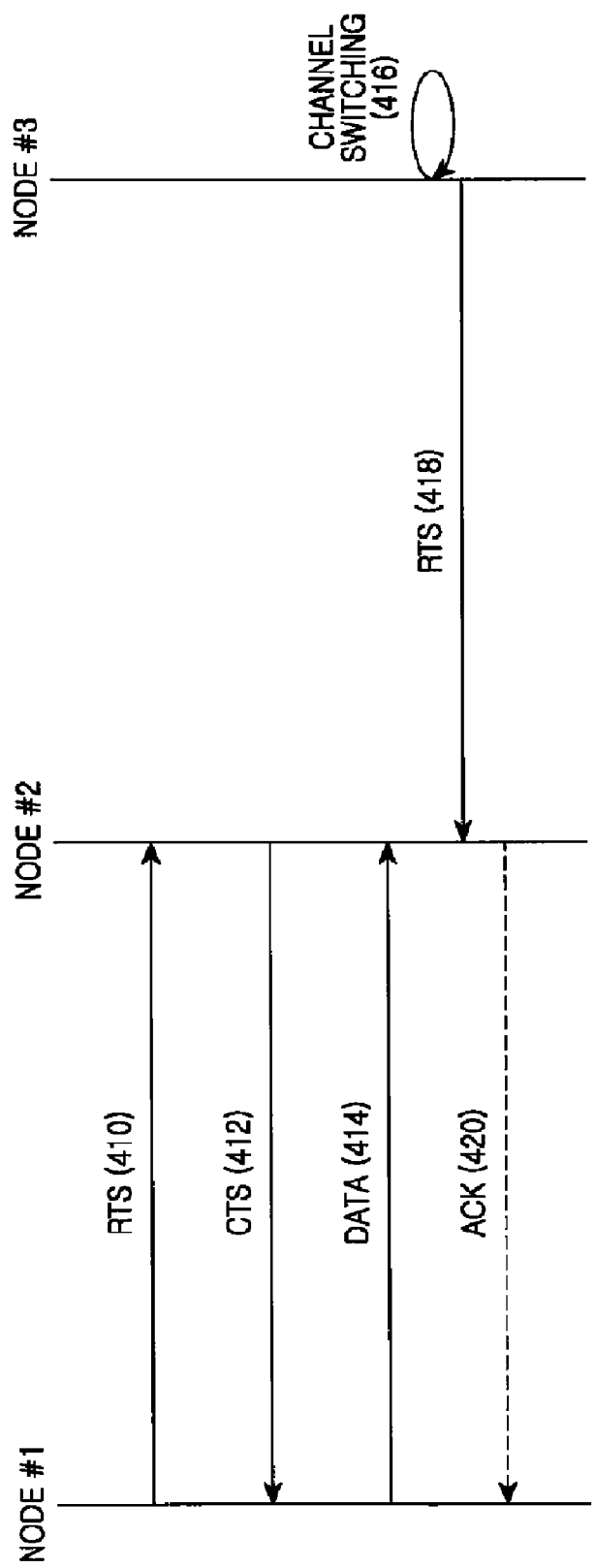
FIG. 4 is a diagram illustrating a signal flow between nodes during a data transmission interval in the conventional mesh network.
Figure 5:
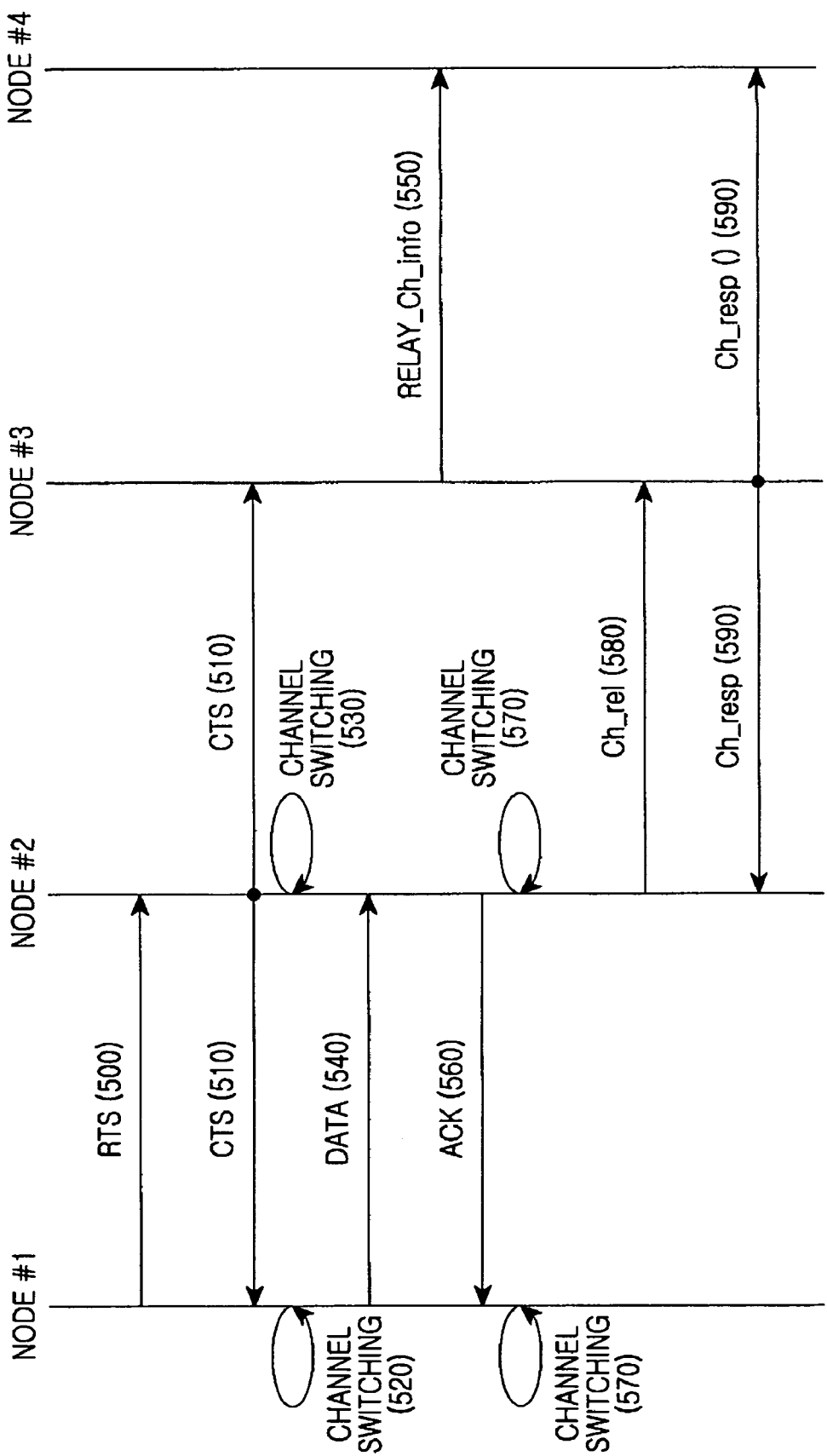
FIG. 5 is a diagram illustrating a signaling procedure for multi-channel allocation according to an exemplary embodiment of the present invention.

FIG. 5 is a diagram illustrating a signaling procedure for multi-channel allocation according to an exemplary embodiment of the present invention. In FIG. 5, a traffic channel is established between Node #1 and Node #2 in a mesh network with four nodes.

Referring to FIG. 5, Node #1 to Node #4 each creates an initial neighbor node table according to temporary traffic channels allocated to neighbor nodes. The creation of the initial neighbor node table will be described later in detail.

Node #1 broadcasts an RTS message in the mesh network in step 500. Upon generation of transmission data, the transmitting node broadcasts the RTS message on a predetermined control channel among a plurality of channels.

Node #2, one of the neighbor nodes of Node #1 receives the RTS message and determines a traffic channel on which to receive the data from Node #1. Node #2 then broadcasts a CTS message including information relating to the determined traffic channel on the control channel in step 510.

Upon receipt of the CTS message, Node #1 determines the traffic channel which is allocated to Node #1. Node #1 switches from the control channel to the traffic channel in step 520.

Besides Node #1, Node #2 also switches from the control channel to the traffic channel in step 530.

Meanwhile, the CTS message is received at at least one neighbor node of Node #2 as well as at Node #1. Thus, Node #3 which is a neighbor to Node #2 also receives the CTS message in step 510.

Node #3 acquires information about the traffic channel to be used for Node #2 from the CTS message and updates its neighbor node table with the traffic channel information by indicating the traffic channel as unavailable.

Node #3 broadcasts the acquired traffic channel information to at least one neighbor node at the next hop by Relay_ch_info in step 550.

Upon receipt of Relay_ch_info, Node #4 which is a neighbor to Node #3 acquires the traffic channel information of Node #2 and updates its neighbor node table by indicating the traffic channel used by Node #2 as unavailable.

In step 540, Node #1 sends data on the switched traffic channel. After receiving the data, Node #2 sends a response signal on the traffic channel in step 560. If the data reception is successful, the response signal is an ACK. Alternatively, if the data reception is not successful, the response signal is a NACK.

If the NACK signal is received, Node #1 repeats steps 500 to 560. If the ACK signal is received, Node #1 terminates the data transmission. Node #1 then switches from the traffic channel to the control channel in step 570.

After sending the ACK signal, Node #2 also switches from the traffic channel to the control channel in step 570 and broadcasts Ch_rel including information about the released traffic channel to at least one neighbor node on the control channel in step 580.

Node #3 acquires the traffic channel information from Ch_rel and updates its neighbor node table with the traffic channel information by indicating the traffic channel released from Node #2 as available.

In step 590, Node #3 broadcasts Ch_resp including the traffic channel information for Ch_rel to at least one neighbor node on the control channel.

Node #2 and Node #4 are neighbors to Node #3 receive Ch_resp. They acquire the traffic channel information from Ch_resp and correspondingly update their neighbor node tables with the traffic channel information by indicating the released traffic channel as available.

Updating the neighbor node tables of neighboring nodes of Node #1 is not described in FIG. 5 since it is clear that the neighbor node tables are managed in the same manner as described above.

As described above, each node uses a traffic channel during a data transmission interval and uses a control channel during the remaining interval. The node collects the channel information of neighbor nodes on the control channel, when it does not send data, which obviates the need for separating a beacon interval into a common channel interval and a selected channel interval.

Figure 6A:
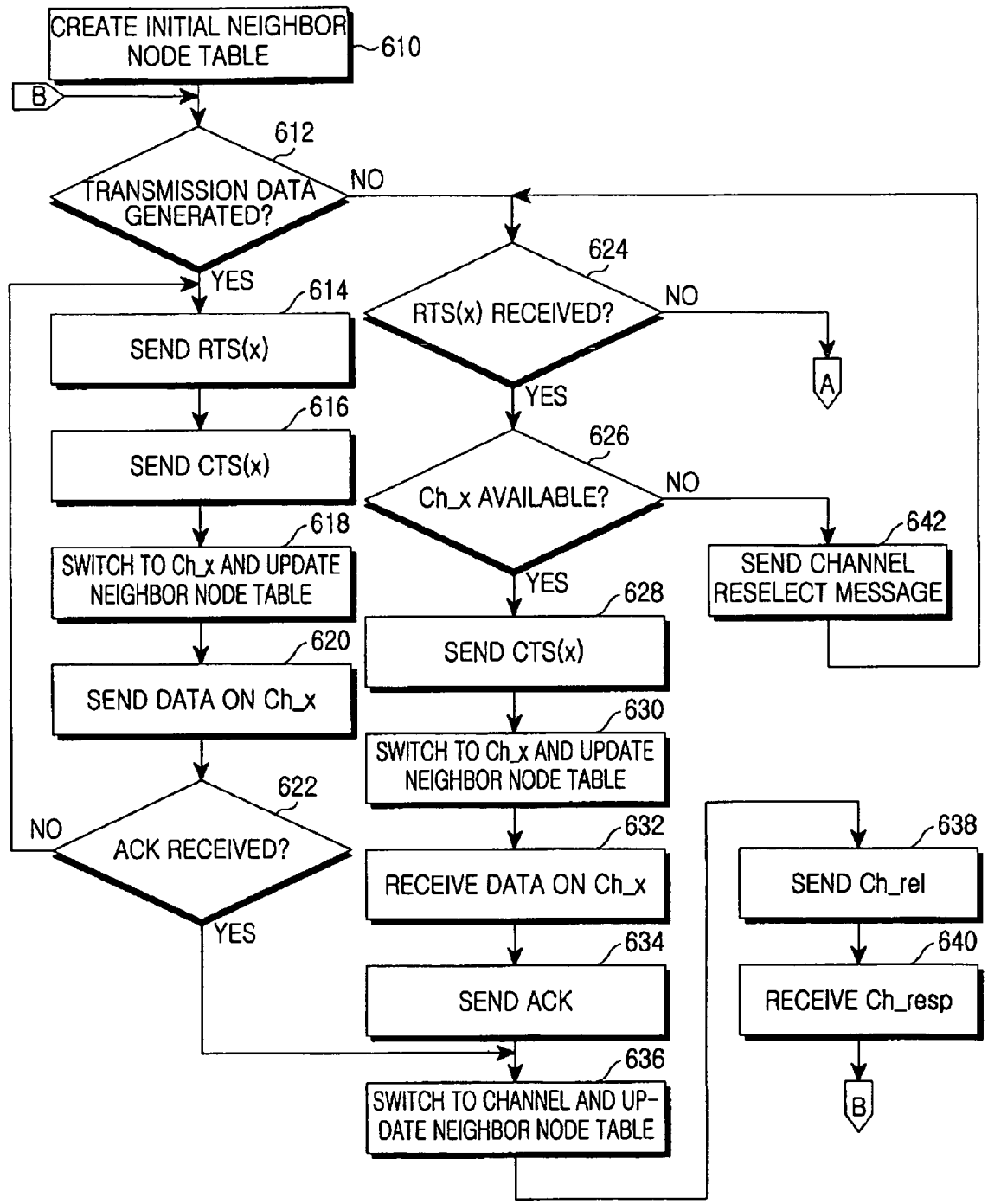
FIGS. 6A and 6B are flowcharts illustrating a control operation of a node in a mesh network, for the multi-channel allocation according to an exemplary embodiment of the present invention.
Figure 6B:
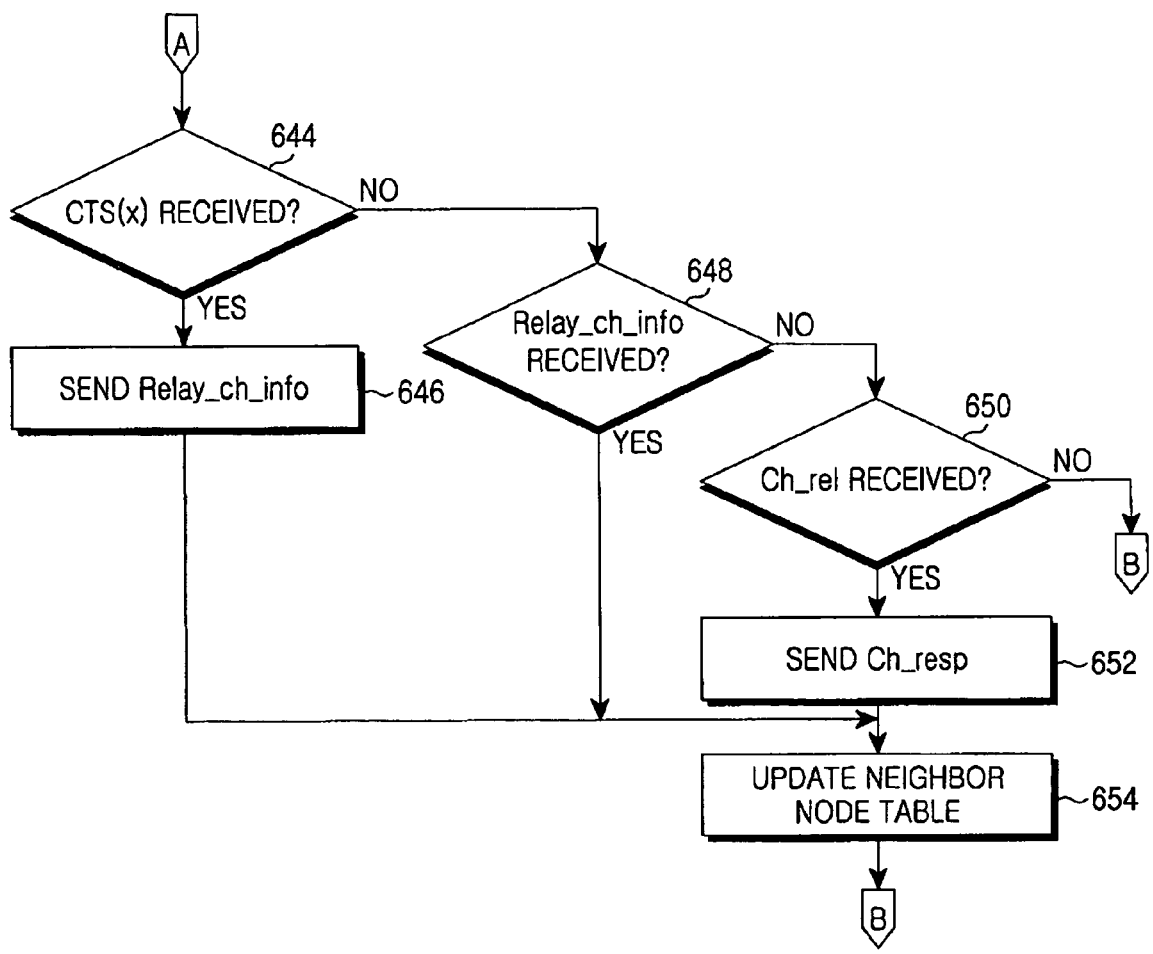

FIGS. 6A and 6B are flowcharts illustrating a control operation of a node in the mesh network, for the multi-channel allocation according to an exemplary embodiment of the present invention.

The control operation is divided into three parts depending on the role of the node: a transmitting node, a receiving node, and a monitoring node. The control operation of a transmitting node includes steps 610 to 622 and steps 636 to 640. The receiving node operates in step 610 and steps 624 to 642 and the monitoring node operates in steps 644 to 654.

When an initial neighbor node table is created in step 610 and transmission data is generated in step 612, the node operates as a transmitting node. The node operates as a receiving node when the initial neighbor node table is created in step 610 and an RTS message requesting channel x, (Ch_x) is received in step 624. It operates as a monitoring node when the initial neighbor node table is created in step 610 and information about the channel setup, channel release, and channel state of a neighbor node is received.

The initial neighbor node table is created using information about available channels and a temporary traffic channel allocated for data transmission to a neighbor node. The available channels are the remaining channels except for the temporary traffic channel among all available channels of the mesh network.

Regarding an operation as the transmitting node, the transmitting node determines whether there is transmission data in step 612. In the presence of transmission data, it broadcasts an RTS message requesting Ch_x on a control channel in step 614. Ch_x is a temporary traffic channel corresponding to a neighbor node to receive the data. Ch_x can be detected from the neighbor node table.

The transmitting node receives a CTS message permitting the use of Ch_x for the RTS message in step 616. The transmitting node may receive a channel reselect message for the RTS message. The channel reselect message indicates that the use of Ch_x is not permitted. The channel reselect message can be a CTS message including the index of an unused channel in the mesh network. If the channel reselect message is received, the transmitting node broadcasts an RTS message requesting another channel in step 614.

Alternatively, if Ch_x is permitted, the transmitting node switches from the control channel to Ch_x and updates its neighbor node table by indicating Ch_x as unavailable in step 618.

The transmitting node sends data on Ch_x in step 620 and monitors reception of an ACK signal for the transmitted data in step 622. If the transmitting node fails to receive the ACK signal, steps 614 to 620 are repeated. Upon receipt of the ACK signal, the transmitting node switches from Ch_x to the control channel and correspondingly updates the neighbor node table by indicating Ch_x as available in step 636.

In step 638, the transmitting node broadcasts Ch_rel indicating the release of Ch_x to neighbor nodes on the control channel. The transmitting node receives Ch_resp for Ch_rel in step 640.

Upon receipt of Ch_resp, the transmitting node returns to step 612. Thus the transmitting node transitions to a state where it can operate as a transmitting, receiving or neighbor node.

As described above, the transmitting node creates the initial neighbor node table and updates it when a traffic channel is allocated for data transmission or the data transmission is completed.

Regarding an operation as a receiving node, the receiving node monitors reception of an RTS message on a control channel in step 624.

Upon receipt of the RTS message, the receiving node determines that Ch_x has been requested and determines whether Ch_x is available by referring to the use state information of each channel written in the neighbor node table in step 626.

If Ch_x is unavailable, the receiving node broadcasts a channel reselect message in step 642. The channel reselect message implies that Ch_x is in use by a neighbor node (a node two hops away from the transmitting node) and thus any other channel is to be requested. The use of Ch_x by the neighbor node can be determined from the neighbor node table.

Alternatively, if Ch_x is available, the receiving node broadcasts a CTS message permitting Ch_x in response to the RTS message in step 628 and switches from the control channel to Ch_x and updates the neighbor node table by indicating Ch_x as unavailable in step 630.

The receiving node then receives data on Ch_x in step 632 and sends an ACK signal for the received data in step 634. In step 636, the receiving node switches from Ch_x to the control channel and updates the neighbor node table by indicating Ch_x as available.

The receiving node broadcasts Ch_rel indicating release of Ch_x to neighbor nodes on the control channel in step 638 and receives Ch_resp for Ch_rel in step 640.

Upon receipt of Ch_resp, the receiving node returns to step 612. Therefore, it transitions to a state in which it can operate as a transmitting, receiving or monitoring node.

As described above, the receiving node creates the initial neighbor node table and updates the table when the traffic channel is allocated for data transmission or the data transmission is completed. The data transmission completion is equivalent to transmission of the ACK signal.

The monitoring node monitors reception of a CTS message in step 644. The monitoring node also monitors reception of Relay_ch_info in step 648 and reception of Ch_rel in step 650. Reception of the CTS message means that a neighbor node (such as a receiving node) has permitted the use of a channel requested by a transmitting node. Reception of Relay_ch_info means that a node two hops away (such as a receiving node) has permitted the use of a channel requested by a transmitting node. Reception of Ch_rel means that a traffic channel used by a neighbor node (such as a transmitting or receiving node) has been released.

Upon receipt of the CTS message, the monitoring node determines that a channel Ch_x is indicated by the CTS message. Then, the monitoring node broadcasts Relay_ch_info including information about the traffic channel Ch_x in step 646.

In step 654, the monitoring node updates its neighbor node table by indicating Ch_x as unavailable because Ch_x is permitted for the neighbor node.

If Relay_ch_info is received, the monitoring node checks Ch_x to be used for a node two hops away from the traffic channel information included Relay_ch_info. The monitoring node then updates the neighbor node table by indicating Ch_x as unavailable because Ch_x is permitted for the node two hops away in step 654.

If Ch_rel is received, the monitoring node acquires traffic channel information from Ch_rel. The traffic channel information is about Ch_x released from the neighbor node. That is, the monitoring node determines the released traffic channel from Ch_rel.

The monitoring node constructs Ch_resp including the acquired traffic channel information and broadcasts Ch_resp on the control channel in step 652 and correspondingly updates the neighbor node table by indicating Ch_x as available because Ch_x has been released from the neighbor node in step 654.

When no control channel is received or completing the neighbor node table is not completed, the monitoring node returns to step 612. Therefore, it can transition to a state in which it operates as a transmitting, receiving or monitoring node.

As described above, the monitoring node creates the initial neighbor node table and updates the neighbor node table when a neighbor node or a node two hops away is changed as indicated by control messages. The control messages carry channel setup information, channel release information, and channel state information. For example, the control messages are a CTS message, Relay_ch_info and Ch_rel.

Figure 7:
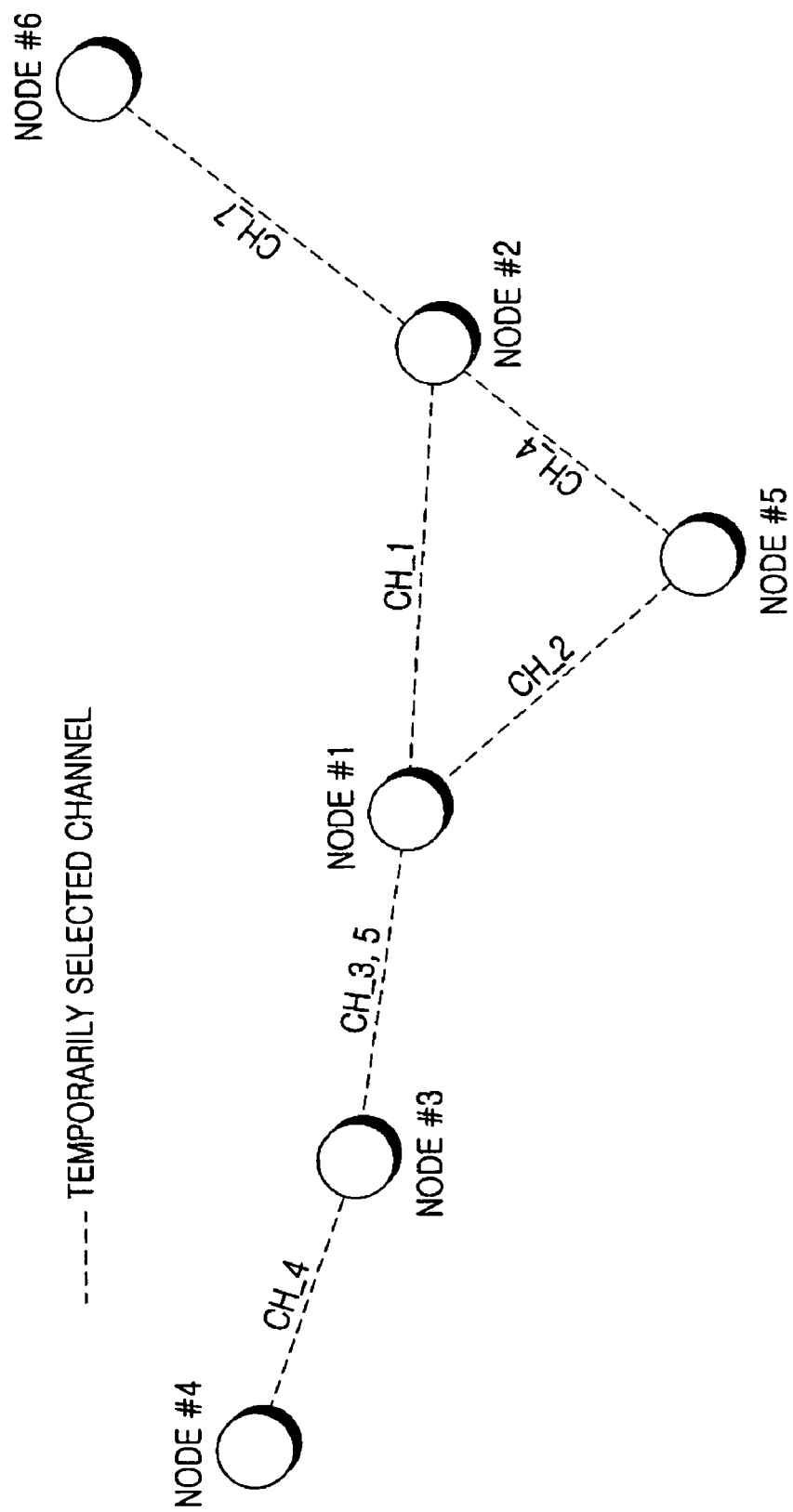
FIG. 7 illustrates an exemplary configuration of a mesh network to which the multi-channel allocation according to an exemplary embodiment of the present invention is applied.

FIG. 7 illustrates an exemplary configuration of the mesh network to which the multi-channel allocation according to an exemplary embodiment of the present invention is applied. In the illustrated case of FIG. 7, a mesh network has six nodes and uses seven channels. A sixth channel, Ch_6 is allocated as a control channel and the remaining channels are allocated as traffic channels. A traffic channel is temporarily allocated between neighbor nodes, which can be done by negotiations between the neighbor nodes.

Each node generates an initial neighbor node table according to temporary traffic channels allocated to its neighbor nodes and the remaining non-allocated traffic channels.

Referring to FIG. 7, Node #2, Node #3 and Node #5 are neighbors to Node #1. A first channel Ch_1 is established as a temporary traffic channel between Node #1 and Node #2. Third and fifth channels Ch_3 and Ch_5 are established as temporary traffic channels between Node #1 and Node #3. A second channel Ch_2 is established as a temporary traffic channel between Node #1 and Node #5. Accordingly, the creation of the initial neighbor node table of Node #1 is discussed below.

TABLE 1

| Available Channels | CH_4, CH_6, CH_7 |
|---|---|
| Node #2 | Ch_1 |
| Node #3 | Ch_3, Ch_5 |
| Node #5 | Ch_2 |

Node #1, Node #5 and Node #6 are neighbors to Node #2. Ch_1 is established as a temporary traffic channel between Node #1 and Node #2. A fourth channel Ch_4 is established as a temporary traffic channel between Node #2 and Node #5. A seventh channel Ch_7 is established as a temporary traffic channel between Node #2 and Node #6. Accordingly, the creation of the initial neighbor node table of Node #2 is discussed below.

TABLE 2

| Available Channels | CH_2, CH_3, CH_5, CH_6 |
|---|---|
| Node #1 | Ch_1 |
| Node #5 | Ch_4 |
| Node #6 | Ch_7 |
| Node #5 | Ch_2 |

Node #1 and Node #4 are neighbors to Node #3. Ch_3 and Ch_5 are established as temporary traffic channels between Node #1 and Node #3. Ch_4 is established as a temporary traffic channel between Node #4 and Node #3. Accordingly, the creation of the initial neighbor node table of Node #3 is discussed below.

TABLE 3

| Available Channel | CH_1, CH_2, CH_6, CH_7 |
|---|---|
| Node #1 | Ch_3, Ch_5 |
| Node #4 | Ch_4 |

Node #3 is a neighbor to Node #4. Ch_4 is established as a temporary traffic channel between Node #4 and Node #3. Accordingly, the creation of the initial neighbor node table of Node #4 is discussed below.

TABLE 4

| Available Channels | CH_1, CH_2, CH_3, CH_5, CH_6, CH_7 |
|---|---|
| Node #3 | Ch_4 |

Node #1 and Node #2 are neighbors to Node #5. Ch_2 is established as a temporary traffic channel between Node #1 and Node #5. Ch_4 is established as a temporary traffic channel between Node #4 and Node #3 and Ch_4 is established as a temporary traffic channel between Node #2 and Node #5. Accordingly, the creation of the initial neighbor node table of Node #5 is discussed below.

TABLE 5

| Available Channels | CH_1, CH_3, CH_5, CH_6, CH_7 |
|---|---|
| Node #1 | Ch_2 |
| Node #2 | Ch_4 |

Node #2 is neighbor to Node #6. Ch_7 is established as a temporary traffic channel between Node #2 and Node #6. Accordingly, the creation of the initial neighbor node table of Node #6 is discussed below.

TABLE 6

| Available Channels | CH_1, CH_2, CH_3, CH_4, CH_5, CH_6 |
|---|---|
| Node #2 | Ch_7 |

As described above, each node manages information about the use states of traffic channels of nodes two hops away by its neighbor node table.

After creating the initial neighbor node table, the node updates the table according to the use states of channels in the mesh network. That is, the node updates the neighbor node table when a traffic channel is used for data transmission or reception or when the traffic channel is released.

The node also collects channel switching information about neighbor nodes by control messages and updates its neighbor node table based on the channel switching information. The control messages include CTS, Relay_ch_info, and Ch_rel.

The node updates the neighbor node table in cases where a channel is in use for a neighbor node from which Ch_resp is not received.

Figure 8:
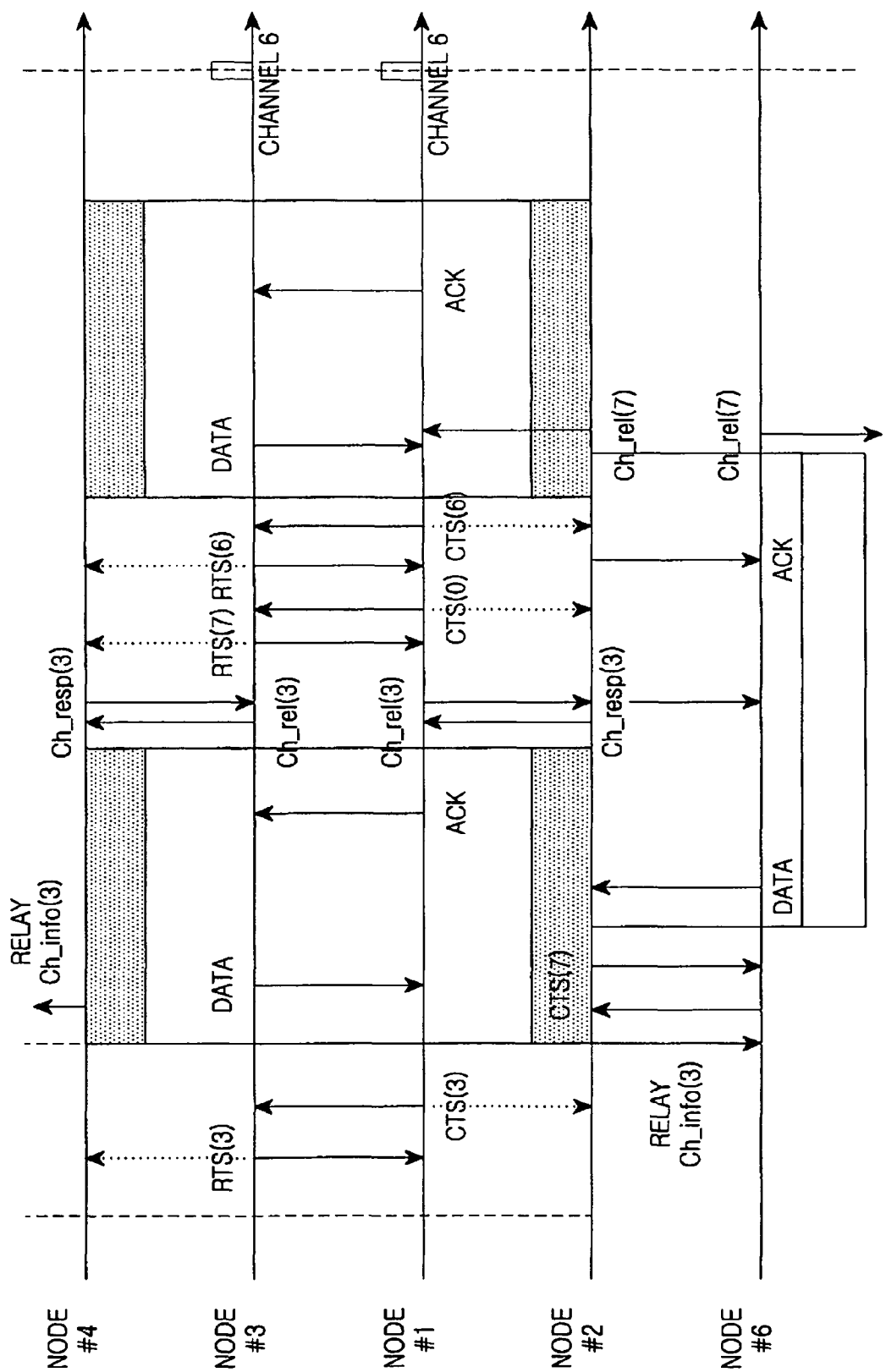
FIG. 8 is a diagram illustrating a signaling procedure performed according to the multi-channel allocation method according to an exemplary embodiment of the present invention.

FIG. 8 is a diagram illustrating a signaling procedure performed according to the multi-channel allocation method according to an exemplary embodiment of the present invention.

Referring to FIG. 8, Node #3 broadcasts an RTS message requesting Ch_3 on a control channel. Node #1 receives the RTS message and broadcasts a CTS message permitting use of Ch_3 on the control channel. Node #1 then updates its neighbor node table by indicating Ch_3 as unavailable.

Upon receipt of the CTS message, Node #3 updates its neighbor node table by indicating Ch_3 as unavailable and sends data to Node #1 on Ch_3. Node #1 sends an ACK signal to Node #3 on Ch_3.

Meanwhile, the RTS message requesting Ch_3 is also received at Node #4. Node #4 updates its neighbor node table by indicating Ch_3 as unavailable. Node #2 and Node #5 which are neighbors to Node #1 receive the CTS message broadcast from Node #1. Thus, Node #2 and Node #5 update their neighbor node tables by indicating Ch_3 as unavailable. Node #2 and Node #5 broadcast Relay_ch_info.

Node #6 is a neighbor to Node #2 and Node #5 receives Relay_ch_info and updates its neighbor node table by indicating Ch_3 as unavailable.

As described above, when Node #3 sends data to Node #1 on Ch_3, every node in the mesh network updates its neighbor node table correspondingly.

Node #6 broadcasts an RTS message requesting Ch_7 on the control channel. Node #2 receives the RTS message and broadcasts a CTS message permitting use of Ch_7 on the control channel. Node #2 then updates its neighbor node table by indicating Ch_7 as unavailable.

Upon receipt of the CTS message, Node #6 updates its neighbor node table by indicating Ch_7 as unavailable and sends data to Node #2 on Ch_7. Node #2 sends an ACK signal to Node #6 on Ch_7.

A procedure exists for sending a notification that Ch_7 is in use between Node #2 and Node #6 and neighbor nodes update their neighbor node tables in the above-described procedure. That is, Node #1, Node #3, and Node #5 update their neighbor node tables in relation to the use of CH_7.

When Node #6 sends data to Node #2 on Ch_7, neighbor node table are updated in Node #1, Node #2, Node #3, Node #5, and Node #6 in the mesh network.

When the data transmission from Node #3 to Node #1 is completed, Ch_rel indicating release of Ch_3 is broadcast on the control channel.

Node #4 and Node #2 receive Ch_rel and update the neighbor node tables by indicating Ch_3 as available. They broadcast Ch_resp for Ch_rel.

Node #1 and Node #6 receive Ch_resp and update the neighbor node tables by indicating Ch_3 as available.

Meanwhile, upon generation of additional transmission data, Node #3 broadcasts an RTS message requesting Ch_7. Node #1 receives the RTS message and determines from the neighbor node table that Ch_7 is in use for another node, that is, Node #2. Node #1 then broadcasts a channel reselect message on the control channel, indicating Ch_7 is unavailable. The channel reselect message is a CTS message indicating Ch_0.

Upon receipt of the channel reselect message, Node #3 selects one of the available channels and broadcasts an RTS message requesting the selected channel (Ch_6, herein) on the control channel.

Upon receipt of the RTS message, Node #1 broadcasts a CTS message permitting use of Ch_6 on the control channel and updates the neighbor node table by indicating Ch_6 as unavailable.

Upon receipt of the CTS message, Node #3 updates the neighbor node table by indicating Ch_6 as unavailable and sends the data to Node #1 on Ch_6. Node #1 receives the data and replies with an ACK signal.

Meanwhile, the RTS message requesting Ch_6 is also received at Node #2. Node #4 updates its neighbor node table by indicating Ch_6 as unavailable. Node #2 broadcasts Relay_ch_info on the control channel. Node #6, receiving Relay_ch_info, updates its neighbor node table by indicating Ch_6 as unavailable.

When Node #3 sends data to Node #1 on Ch_6, every node in the mesh network updates its neighbor node table.

When the data transmission ends, Node #2 and Node #6 broadcast Ch_rel indicating release of Ch_6 on the control channel.

Node #1 receives Ch_rel and updates the neighbor node tables by indicating Ch_7 as available. While not shown in FIG. 8, Node #1 broadcasts Ch_resp for Ch_rel.

Node #2 and Node #3 receive Ch_resp and update their neighbor node tables by indicating Ch_7 as available.

Each node manages information about traffic channels in use for their neighbor nodes and nodes which are two hops away by a neighbor node table. When the node sends data, it establishes a traffic channel referring to the neighbor node table.

As described above, exemplary embodiments of the present invention advantageously solve the hidden terminal problem that may be encountered with establishing multiple channels between nodes which each have a single interface. Therefore, the channel use rate of the nodes using the multiple channels is maximized.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of establishing multiple channels between a plurality of nodes each comprising a single radio interface in a mesh network supporting multiple channels, the method comprising:
   generating a neighbor node table in a first node of the plurality of nodes, taking into account at least one traffic channel temporarily established for data transmission to a second node;
   selecting one of the at least one traffic channel and determining whether use of the selected traffic channel is permitted;
   updating the neighbor node table to indicate that the selected traffic channel among the multiple channels is unavailable when the use of the selected traffic channel is permitted; and
   updating the neighbor node table according to channel use information of a third node which is one of a plurality of neighbor nodes and channel use information of a fourth node two hops away from the first node, received from at least one among the plurality of the neighbor nodes,
   wherein the use of the selected traffic channel is not permitted when the neighbor node table indicates that the selected traffic channel is in use for one of the third node and the fourth node,
   wherein the neighbor node table indicates at least one channel used by the plurality of the neighbor nodes among the multiple channels and at least one channel available by the first node among the multiple channels, and
   wherein the channel use information indicates at least one channel used by a corresponding node among the multiple channels.

2. The method of claim 1, wherein the generating of the neighbor node table comprises generating the neighbor node table, further taking into account remaining traffic channels which have not been established temporarily for the data transmission to the second node.

3. The method of claim 1, wherein the determining of whether the use of the selected traffic channel is permitted comprises requesting the use of the selected traffic channel to the second node and determining that the use of the selected traffic channel is permitted when a permission about the use of the selected traffic channel from the second node is received.

4. The method of claim 1, wherein the channel use information of the third node is provided in a use permission message transmitted from the at least one among the plurality of the neighbor nodes.

5. The method of claim 4, wherein the channel use information of the fourth node is provided in a channel setup message from a neighbor node which has received the use permission message.

6. The method of claim 1, further comprising, when the data transmission on the selected traffic channel is completed, releasing the selected traffic channel and updating the neighbor node table to indicate that the released traffic channel is available.

7. The method of claim 6, further comprising transmitting a channel release message indicating the release of the selected traffic channel and receiving a channel release response message in response to the channel release message.

8. The method of claim 7, further comprising, when the channel release response message is received, updating the neighbor node table to indicate that the released traffic channel is available.

9. The method of claim 1, wherein the selecting of the one of at least one traffic channel comprises selecting, by the first node, the one among the at least one traffic channel by using a control channel collecting a channel use information of the plurality of neighbor nodes.

10. The method of claim 9, further comprising switching the control channel to the traffic channel when the selected traffic channel is available.

11. The method of claim 10, wherein the neighbor node table is updated according to the switching to the selected traffic channel.

12. A system for multiple channels between nodes each comprising a single radio interface in a mesh network supporting multiple channels, the system comprising:
   a transmitting node configured to update a first neighbor node table to indicate that a traffic channel selected among the multiple channels for data transmission to a receiving node is unavailable when use of the selected traffic channel is permitted, and configured to update the first neighbor node table according to channel use information of a neighbor node and channel use information of a two-hop node two hops away from the transmitting node, received from at least one among a plurality of neighbor nodes, the use of the selected traffic channel being not permitted when the first neighbor node table indicates that the selected traffic channel is in use for one of the neighbor node and the two-hop node;
   the receiving node configured to update a second neighbor node table to indicate that the selected traffic channel is available when the selected traffic channel is released for data reception from the transmitting node and when the data reception is completed and thus the selected traffic channel is released;
   the neighbor node configured to update a third neighbor node table when the selected traffic channel is permitted by the receiving node according to a request of the transmitting node and when the use of the selected traffic channel by at least one of the transmitting node and the receiving node is terminated; and
   the two-hop node configured to update a fourth neighbor node table by a channel setup message received from the neighbor node in correspondence with the permitted traffic channel and by a channel release response message received from the neighbor node in correspondence with the released traffic channel,
   wherein at least one of the transmitting node, the receiving node, the neighbor node, and the two-hop node is further configured to generate a neighbor node table initially according to at least one traffic channel temporarily established for the data transmission,
   wherein the first neighbor node table indicates at least one channel used by the plurality of the neighbor nodes among the multiple channels and at least one channel available by the transmitting node among the multiple channels, and
   wherein the channel use information indicates at least one channel used by a corresponding node among the multiple channels.

13. The system of claim 12, wherein each of the transmitting node, the receiving node, the neighbor node, and the two-hop node is further configured to generate the neighbor node table initially, further taking into account remaining traffic channels which have not been established temporarily for the data transmission.

14. The system of claim 13, wherein the transmitting node is further configured to request the use of the selected traffic channel to the receiving node, determining that the use of the selected traffic channel is permitted when a permission about the use of the selected traffic channel from the receiving node is received.

15. The system of claim 14, wherein, if the second neighbor node table indicates that the requested traffic channel is in use for the neighbor node, the receiving node is further configured to not permit the use of the requested traffic channel.

16. The system of claim 12, wherein the channel use information of the neighbor node is provided in a use permission message transmitted from the at least one among the plurality of the neighbor nodes.

17. The system of claim 16, wherein the channel use information of the two-hop node is provided in a channel setup message from a neighbor node which has received the use permission message.

18. An apparatus for multiple channels between nodes each comprising a single radio interface in a mesh network supporting multiple channels, the apparatus comprising:

a table generator configured to generate a neighbor node table in a first node, taking into account at least one traffic channel temporarily established for data transmission to a second node;

a channel selector configured to select one of the at least one traffic channel, determining whether use of the selected traffic channel is permitted, and not permit the use of the selected traffic channel when the neighbor node table indicates that the selected traffic channel is in use for one of a third node which is one of a plurality of neighbor nodes and a fourth node two hops away from the first node; and a table updater configured to update the neighbor node table to indicate that the selected traffic channel among the multiple channels is unavailable when the use of the selected traffic channel is permitted, and configured to update the neighbor node table according to channel use information of the third node and channel use information of the fourth node, received from at least one among the plurality of the neighbor nodes, wherein the neighbor node table indicates at least one channel used by the plurality of the neighbor nodes among the multiple channels and at least one channel available by the first node among the multiple channels, wherein the channel use information indicates at least one channel used by a corresponding node among the multiple channels.

* * * * *